United States Patent
Peylo et al.

(10) Patent No.: US 10,200,273 B2
(45) Date of Patent: Feb. 5, 2019

(54) METHOD AND SYSTEM OF DATA ROUTING THROUGH TIME-VARIANT CONTEXTUAL TRUST

(71) Applicant: Deutsche Telekom AG, Bonn (DE)

(72) Inventors: Christoph Peylo, Damme (DE); Julian Charles Nolan, Pully (CH)

(73) Assignee: DEUTSCHE TELEKOM AG, Bonn (DE)

( * ) Notice: Subject to any disclaimer, the term of this patent is extended or adjusted under 35 U.S.C. 154(b) by 262 days.

(21) Appl. No.: 14/515,555

(22) Filed: Oct. 16, 2014

(65) Prior Publication Data

US 2015/0120960 A1    Apr. 30, 2015

(30) Foreign Application Priority Data

Oct. 31, 2013   (EP) ..................................... 13191095

(51) Int. Cl.
| | |
|---|---|
| *H04L 12/701* | (2013.01) |
| *H04W 12/02* | (2009.01) |
| *H04L 12/721* | (2013.01) |
| *H04W 84/18* | (2009.01) |

(52) U.S. Cl.
CPC .............. *H04L 45/00* (2013.01); *H04L 45/12* (2013.01); *H04W 12/02* (2013.01); *H04W 84/18* (2013.01)

(58) Field of Classification Search
CPC ......... H04L 45/00; H04L 45/12; H04W 12/02
USPC ......................................................... 709/238
See application file for complete search history.

(56) References Cited

U.S. PATENT DOCUMENTS

| | | | | |
|---|---|---|---|---|
| 5,602,852 | A | * | 2/1997 | Shiobara ............... H04L 12/433 370/455 |
| 7,881,474 | B2 | * | 2/2011 | Sun ..................... H04L 63/0428 380/270 |
| 2003/0067880 | A1 | * | 4/2003 | Chiruvolu ........... H04J 14/0227 370/237 |
| 2007/0116292 | A1 | * | 5/2007 | Kurita .................. H04L 9/0844 380/270 |

(Continued)

FOREIGN PATENT DOCUMENTS

WO    WO 2012148257 A1 * 11/2012 ............ H04W 12/06

OTHER PUBLICATIONS

Zheng Yan, et al., "Trust Evaluation Based Security Solution in Ad Hoc Networks", Proceedings of the Seventh Nordic Workshop on Secure IT Systems, vol. 14, Oct. 1, 2003.
Seung Yi, et al., "Security Aware Ad Hoc Routing for Wireless Networks", ACM International Symposium on Mobile Ad Hoc Networking Mobihoc '01, Oct. 4, 2001.

(Continued)

*Primary Examiner* — Chris Parry
*Assistant Examiner* — Antony Clayborn
(74) *Attorney, Agent, or Firm* — Leydig, Voit & Mayer, Ltd.

(57) ABSTRACT

A method of data routing in a network through time-variant contextual trust includes: determining, by the network, a level and a nature of confidentiality of data to be transmitted from at least one network component to at least one recipient network component; determining, by the network, a time-variant availability of at least one hop node; determining, by the network, an owner of the at least one hop node and a profile of the owner of the at least one hop node; determining, by the network, a time-variant contextual trust between an owner of the at least one network component and the owner of the at least one hop node; and determining, by the network, a hop routing strategy for data routing.

18 Claims, 8 Drawing Sheets

(56) References Cited

U.S. PATENT DOCUMENTS

| | | | | |
|---|---|---|---|---|
| 2007/0239892 | A1* | 10/2007 | Ott | H04L 29/06 709/242 |
| 2007/0297405 | A1* | 12/2007 | He | H04L 45/00 370/389 |
| 2008/0084294 | A1* | 4/2008 | Zhiying | G08B 21/12 340/539.22 |
| 2009/0228951 | A1* | 9/2009 | Ramesh | H04L 63/0218 726/1 |
| 2009/0252161 | A1* | 10/2009 | Morris | H04L 45/124 370/389 |
| 2010/0146289 | A1* | 6/2010 | Kamakaris | H04L 9/0875 713/180 |
| 2010/0332831 | A1* | 12/2010 | Shon | H04L 9/0833 713/168 |
| 2011/0099365 | A1* | 4/2011 | Dhawan | H04K 1/04 713/150 |
| 2011/0126016 | A1* | 5/2011 | Sun | H04L 63/0428 713/171 |
| 2011/0314273 | A1* | 12/2011 | Chu | H04L 63/105 713/153 |
| 2013/0019317 | A1* | 1/2013 | Whelan | H04B 7/18593 726/26 |
| 2013/0239171 | A1* | 9/2013 | Ramesh | H04L 63/0218 726/1 |

OTHER PUBLICATIONS

Jin-Hee Cho, et al., "A Survey on Trust Management for Mobile Ad Hoc Networks", IEEE Communications Surveys, IEEE, vol. 13, No. 4, Oct. 1, 2011.

* cited by examiner

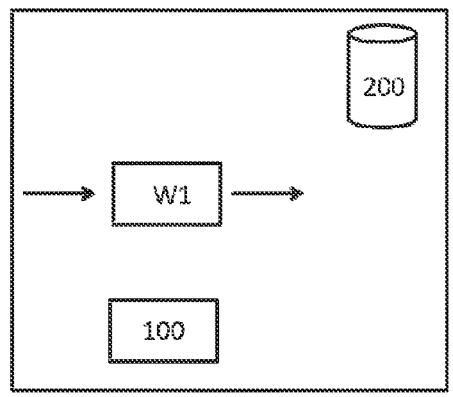 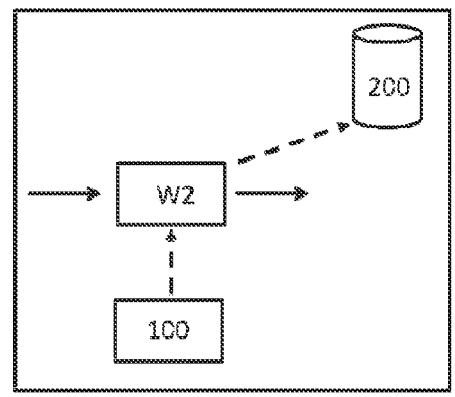
Fig. 9a    Fig. 9b
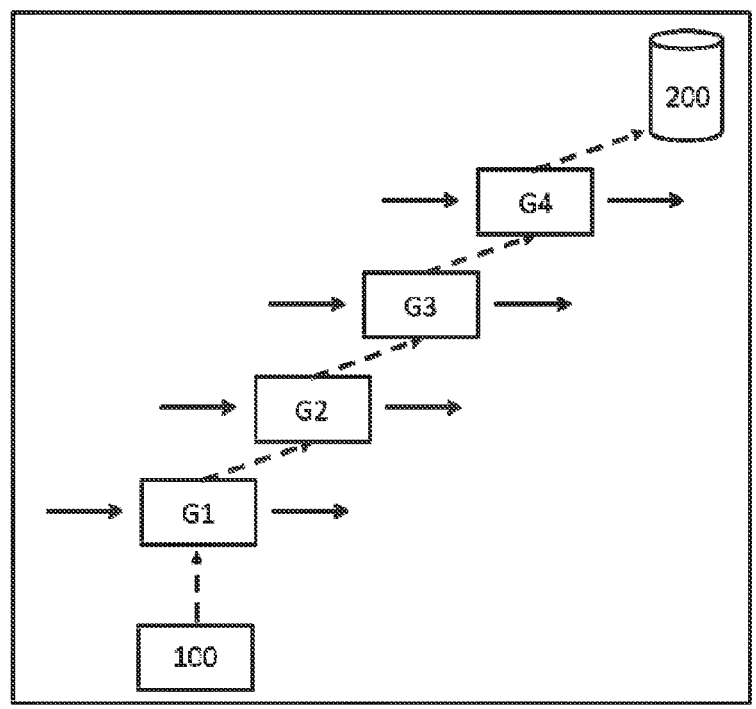
Fig. 10

METHOD AND SYSTEM OF DATA ROUTING THROUGH TIME-VARIANT CONTEXTUAL TRUST

CROSS-REFERENCE TO PRIOR APPLICATIONS

Priority is claimed to European Patent Application No. EP13191095.2, filed on Oct. 31, 2013, the entire disclosure of which is hereby incorporated by reference herein.

FIELD

This invention relates to a method and a system of data routing in a network through time-variant contextual trust.

BACKGROUND

Networks, in particular sensor networks are rapidly increasing in number and are owned by a wide variety of government and private organizations as well as private individuals. In this context, data to be transmitted may be encrypted by processors associated with network components, in particular sensor nodes, before transmission. However, this encryption is not always possible or desirable, e.g. due to limited resources, or does not provide an adequate level of security.

One possibility of safeguarding data in a network, in particular an ad-hoc network which is not secure, is to control the way it is routed. For example, data packets can be routed through different hop nodes so no single hop node has a complete set of data packages, e.g. sensor samples. However, this method is not feasible if only one possible path exists or if all packets will in a certain event possibly be received by more than one hop node.

Accordingly, a way is required where trust can be established between the owner of the network component and a potential hop node.

WO 2012/148257 A1 relates to a method for use in a wireless sensor network comprising at least one gateway and at least two nodes wherein a bi-directional authentication between nodes and between node and gateway are performed.

US 2011/126016 A1 relates to methods and devices for a security architecture for use in a wireless multi-hop network.

Balakrishnan et al., "TEAM: Trust Enhanced Security Architecture for Mobile Ad-hoc Networks", Networks, 2007, ICON 2007, 15$^{th}$ IEEE International Conference, relates to security in mobile ad-hoc networks wherein a trust model is presented.

Karlsson et al., "Routing Security in Mobile Ad-hoc Networks", Informing Science and Information Technology Education 2012 Conference (InSITE'12) 22-27 Jun. 2012, Montreal Canada, relates to the role of infrastructure-less mobile ad-hoc networks in ubiquitous networks.

Lacharité et al., "A Trust Based Security Architecture for Tactical MANETS", Military Communications Conference, 2008, MILCOM 2008, relates to the security establishment of tactical MANETS.

SUMMARY

In an embodiment, the invention provides a method of data routing in a network through time-variant contextual trust. The method includes: determining, by the network, a level and a nature of confidentiality of data to be transmitted from at least one network component to at least one recipient network component; determining, by the network, a time-variant availability of at least one hop node; determining, by the network, an owner of the at least one hop node and a profile of the owner of the at least one hop node; determining, by the network, a time-variant contextual trust between an owner of the at least one network component and the owner of the at least one hop node; and determining, by the network, a hop routing strategy for data routing from the at least one network component or from at least one other hop node to the at least one hop node or to the at least one recipient component to generate one or more possible hop connection paths.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 9a and 9b show schematic diagrams of a method of data routing in a network through time-variant contextual trust according to another embodiment of the invention; and FIG. 10 shows a schematic diagram of a method of data routing in a network through time-variant contextual trust according to another embodiment of the invention.

DETAILED DESCRIPTION

Figure 1:
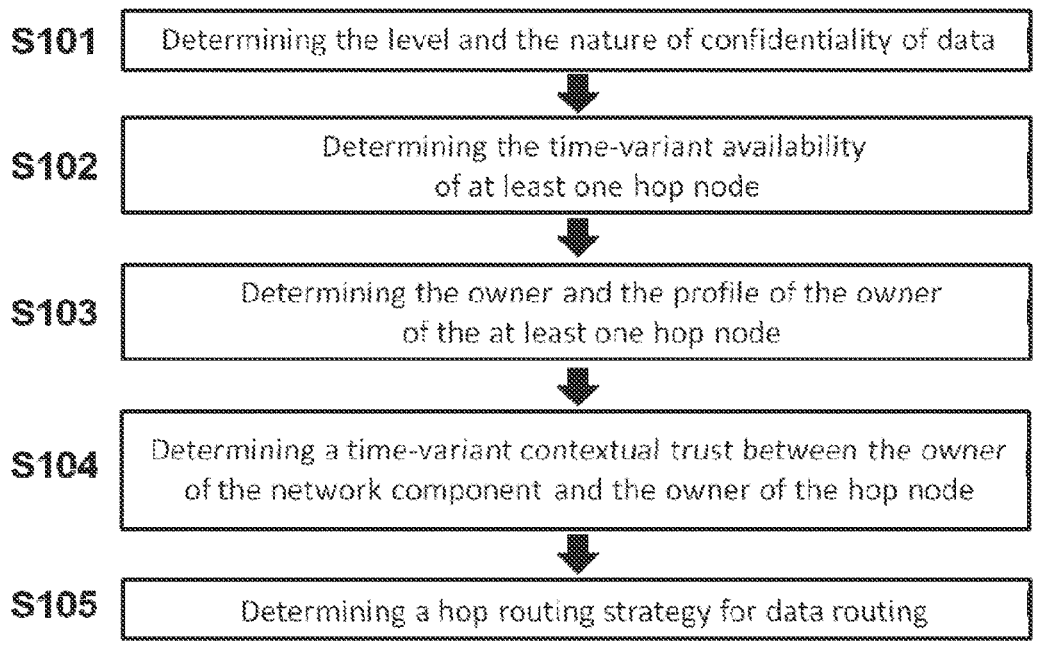
FIG. 1 shows a schematic flowchart of a method of data routing in a network through time-variant contextual trust according to an embodiment of the invention.

Embodiments of the invention provide a method and a system of data routing in a network, in particular an ad-hoc network, through time-variant contextual trust.

In an embodiment, the owners of a network component, e.g. a sensor, and the owner of a hop node are profiled using data mining and other techniques with the obtained profile being evaluated for security relevant characteristics. Thus, an absolute trust level between the network component owner and the hop node owner can be computed, and the relevance of the profile of the owner of the network component to the hop node owner profile in the context of the data to be transferred can be determined. Thus, ownership profiles for both, the network component and potential hop node(s) are evaluated and a level of trust is established between the network component owner and the hop node owner in the context of the data to be transferred. In particular in ad-hoc mobile networks, hop nodes, e.g. mobile communication devices, are likely to move through given trajectories over time and the combined trust of all required hops in respect to the network component owner and the data will change. Moreover, the urgency of transmission is also likely to vary according to the time of last transmission and the maximum latency of the data being communicated to the network. Therefore, a time-varying contextual trust between the network component owner and the potential hop nodes is computed using, among other, contextual trust information, information on which hop nodes are likely to be able to form part of the connection owing to their trajectory and the urgency with which the sensor data must be communicated. In addition, the sensitivity of the data from a transmitting node may be time-variant.

The invention provides a method of data routing in a network through time-variant contextual trust comprising the steps of: determining the level and the nature of confidentiality of data to be transmitted from at least one network component to at least one recipient network component; determining the time-variant availability of at least one hop node; determining the owner and the profile of the owner of the at least one hop node; determining a time-variant contextual trust between the owner of the at least one network component and the owner of the at least one hop node; and determining a hop routing strategy for data routing from the at least one network component or from at least one other hop node to the at least one hop node or to the at least one recipient component resulting in one or more possible hop connection paths.

The level of confidentiality of data can be given in an ordered fashion, i.e. in discrete steps from low-level confidentiality to high-level confidentiality. For example, data having a low-level confidentiality can be information of a temperature or precipitation sensor. Data of high-level confidentiality can be related to governmental or military data or can be related to personal data.

A network component can for example be a sensor in a sensor network and the respective recipient network component can be for example a server or the like which is capable of gathering and/or evaluating the data transmitted from the at least one network component to the at least one recipient network component.

The owner of the at least one network component can be a government or a private organization or private individuals. In this context, the owner can also be a plurality of private individuals or corporate bodies or corporate entities.

The profile of the owner can comprise a unique identifier, e.g. an ID card number, a tax identification number, a social security number or a national insurance number. The profile of the owner can, in particular in case of corporate bodies, comprise a trade register number.

This time-variant availability of the at least one hop node can be dependent on the geographical mobility of the at least one hop node, e.g. in case of a mobile communication device being the at least one hop node.

The owner of the at least one hop node can also be a government or a private organization or private individuals. The owner of the at least one hop node, as in the case for the owner of the at least one network component, can be a corporate body or a corporate entity. The time-variant contextual trust can be dependent on the maximum communication latency of the at least one network component, i.e. the time-variant contextual trust can depend on the maximum amount of time after which the data from the at least on network component to the at least on recipient network component has to be transmitted.

According to an embodiment the method further comprises the steps of: determining the location of at least one network component; and determining the owner and the profile of the owner of the at least one network component.

The location of the network component can be determined by geographical coordinates. The location of the network component can also be its location within a network, i.e. the location of the network can be given by a network address.

According to another embodiment the method further comprises the steps of selecting one of the determined possible hop connection paths and transmitting data using one of the determined possible hop connection paths.

According to another embodiment the hop routing strategy is determined considering at least one of the following: the desired level of trust for the data to be transmitted, the measure of contextual trust between the owner of the at least one network component and the owner of the at least one hop node and/or between the at least one hop node and another hop node, the number of hop nodes and a collective level of contextual trust of the hop nodes, the time since a previous data transfer from the at least one network component to the at least one recipient network component, a maximum latency time for the data being transmitted, the possibility of further potential hop nodes becoming available, the time-variant security policy for each potential hop node, the urgency of the transmission of data, and the time-variant sensitivity of the data to be transmitted.

The time-variant sensitivity can comprise the time-variant level and/or the time-variant nature of confidentiality of data to be transmitted from the at least one network component to the at least one recipient network component. For example, data to be transmitted can be of initial high-level confidentiality which declines in time. In particular, the data to be transmitted can initially be highly secret but after a certain amount of time, e.g. one or two days, the data is also publically available.

According to another embodiment the location of the at least one network component is determined using at least one of: triangulation, satellite navigation, e.g. GPS, wireless network fingerprinting or evaluation of transferred network data.

According to another embodiment the nature and/or level of confidentiality is determined by polling the at least one network component and/or by polling an external data storage device having stored information on said network component, the information being referenced by a first unique ID code.

The polling of the at least one network component in order to determine the nature and/or level of confidentiality can be performed during the initialization of the network and/or the initialization and implementation of the at least one network component into an existing network. In addition, the polling of an external data storage device having stored information on the at least one network component can also be performed at the initialization of the network and/or the initialization and installation of the at least one network component into an existing network. By said determination of the nature and/or level of confidentiality, the nature and/or level of confidentiality of data to be transmitted from said network component is determined for future network communications wherein data from the at least one network component to the at least one recipient network component has to be transmitted. The first unique ID code can be stored encrypted or unencrypted.

The polling of the at least one network component and/or the external data storage device having stored the information on the owner and/or the profile of the owner in order to determine information related to the owner and/or the profile of the owner can be performed during the initialization and installation of a respective network and/or the initialization and installation of the at least one network component into an existing network.

According to another embodiment the information related to the owner and/or the profile of the owner of the at least one network component is determined by polling the at least one network component and/or by polling an external data storage device having stored information on the owner and/or the profile of the owner, the information being referenced by a second unique ID code.

According to another embodiment the profile of the owner of the at least one network component is determined using at least one of: the information stored in the at least one network component and/or in the external data storage device, mining information from web-based resources, crowdsourcing information from other owners of network components and/or hop nodes, estimating the likely profile based on geographic location, metadata and/or network component type, and evaluation of transferred network data.

Web-based resources can be websites, social media networks, e.g. facebook, social networking services, e.g. Twitter or the like or professional company databases. Mining in this context can refer to the extraction of personal information, in particular related to the level of confidentiality, from said web-based resources. Crowdsourcing information from other owners of network components can comprise mining and extracting from other owners and/or private individuals and/or corporate bodies which are in relation to the owner of the at least one network component. For example, crowdsourcing information can comprise the gathering and evaluation of information from people who are friends or colleagues of the owner or have a business connection to the owner.

Estimating the likely profile based on a geographic location can comprise evaluating the neighborhood the owner lives in, i.e. asserting whether it is a neighborhood having a good or a bad reputation. The evaluation of reputation can be based on crime statistics, consumer reports, real estate prices or the like.

According to another embodiment the method further comprises the step of collecting information on the owner and profile of the at least one hop node through the at least one hop node by the at least one network component using additional security layers preferably if the hop routing strategy for data routing results in only one possible hop connection path. In case that only the next hop node is initially known in the method of data routing in the network, one may additionally encrypt the data to be transmitted as an additional security layer. In case that all hop nodes are initially known in the method of data routing in the network, one may establish transport layer security, e.g. a virtual private network tunnel or the like.

According to another embodiment the method further comprises the step of determining a time-variant contextual trust between the at least one hop node and another hop node.

According to another embodiment the method further comprises the step of ranking the determined possible hop connection paths.

According to another embodiment the method further comprises the step of transmitting data without checking any time-variant contextual trust in case of low battery of the at least one network component, urgency of data transmission or low level of confidentiality of data to be transmitted.

According to another embodiment the network is a sensor network and the at least one network component is a sensor node and/or wherein the network is an ad-hoc network and/or the network is a single-hop or a multi-hop network.

The ad-hoc network can particularly comprise a mobile ad-hoc network, preferably an infrastructure-less mobile ad-hoc network.

The invention also relates to a system for data routing in a network through time-variant contextual trust comprising: means for determining the nature and the level of confidentiality of data to be transmitted from the at least one network component to at least one recipient network component; means for determining the time-variant availability of at least one hop node; means for determining the owner and the profile of the owner of the at least one hop node; means for determining a time-variant contextual trust between the owner of the at least one network component and the owner of the at least one hop node; and means for determining a hop routing strategy for data routing from the at least one network component or from at least one other hop node to the at least one hop node or to the at least one recipient component resulting in one or more possible hop connection paths, the means for determining a hop strategy being configured to emit one or more possible hop connection paths.

The system can be comprised in a hop node or a network component. Accordingly the system can be comprised in a computational unit of the hop node or the network component. Thus, the network component or the hop node can autonomously determine the routing strategy and/or the connection path to the next hop node and/or the recipient component.

The system can also be comprised in a surveillance system which determines the routing strategy and/or the connection path from the network component to the recipient component via one or more hop nodes.

According to an embodiment the system further comprises means for determining the location of at least one network component; and means for determining the owner and the profile of the owner of the at least one network component.

According to another embodiment the system further comprises means for selecting one of the determined possible hop connection paths and means for transmitting data using one of the determined possible hop connection paths.

According to another embodiment the means for determining a hop routing strategy are configured to determine a routing strategy considering at least one of the following: the desired level of trust for the data to be transmitted, the measure of contextual trust between the owner of the at least one network component and the owner of the at least one hop node and/or between the at least one hop node and another hop node, the number of hop nodes and a collective level of contextual trust of the hop nodes, the time since a previous data transfer from the at least one network component to the at least one recipient network component, a maximum latency time for the data being transmitted, the possibility of further potential hop nodes becoming available, the time-variant security policy for each potential hop node, the urgency of the transmission of data, and the time-variant sensitivity of the data to be transmitted.

According to another embodiment the means for determining the location of at least one network component are configured to determine the location of the at least one network component using at least one of: triangulation, satellite navigation, e.g. GPS, wireless network fingerprinting or evaluation of transferred network data.

According to another embodiment the means for determining the level and the nature of confidentiality are configured to determine the nature and/or level of confidentiality by polling the at least one network component and/or by polling an external data storage device having stored information on said network component, the information being referenced by a unique first ID code.

According to another embodiment the means for determining the owner and the profile of the owner are configured to determine the information related to the owner and/or the profile of the owner of the at least one network component by polling the at least one network component and/or by polling an external data storage device having stored information on the owner and/or the profile of the owner, the information being referenced by a second unique ID code.

According to another embodiment the means for determining the owner and the profile of the owner are configured to determine the profile of the owner of the at least one network component using at least one of: the information stored in the at least one network component and/or in the external data storage device, mining information from web-based resources, crowdsourcing information from other owners of network components and/or hop nodes, estimating the likely profile based on geographic location; metadata and/or network component type, and evaluation of transferred network data.

According to another embodiment the system further comprises means for collecting information on the owner and profile of the at least one hop node through the at least one hop node by the at least one network component using additional security layers preferably if the hop routing strategy for data routing results in only one possible hop connection path.

According to another embodiment the system further comprises means for determining a time-variant contextual trust between the at least one hop node and another hop node.

According to another embodiment the system further comprises means for ranking the determined possible hop connection paths.

According to another embodiment the system further comprises means for transmitting data without checking any time-variant contextual trust in case of low battery of the at least one network component, urgency of data transmission or low level of confidentiality of data to be transmitted.

According to another embodiment the network is a sensor network and the at least one network component is a sensor node and/or wherein the network is an ad-hoc network and/or the network is a single-hop or a multi-hop network.

FIG. 1 shows a schematic flowchart of a method of data routing in a network through time-variant contextual trust according to an embodiment of the invention. This and the following embodiments of the invention relate to the case that the network is a sensor network, i.e. sensor nodes are the respective network components. However, the invention is not limited to this particular case but is analogous, applicable and/or adaptable to other types of networks and the invention relates to networks in general. Accordingly, sensor networks are given here solely as an example.

In a first step S101, the nature and level of the confidentiality of the data to be transferred are determined. The nature and confidentiality level of the data can be stored in a memory, e.g. a ROM, in the sensor module/network component and/or can be stored in an external database which is referenced by a first unique ID code. Accordingly, the nature and level of confidentiality are determined by polling the at least one network component and/or by polling an external data storage device having stored the information on said data component wherein the information is referenced by said first unique ID code.

In a second step S102, the time-variant availability of the at least one hop node is determined as hop nodes are likely to move through given trajectories over time. For example in case of the hop node being a mobile communication device, e.g. a smartphone, the owner of the smartphone will move certain distances regularly based on his daily routine. For example, the owner of the at least one hop node may go to work in the morning and come back in the evening passing the network component both times. Thus, said hop node would be regularly available twice a day, e.g. 8 a.m. and 6 p.m. Therefore, the available hop nodes over time and the routing of packets between the hop nodes which is required to complete the network connection is likely to vary according to the trajectory of each hop node.

In a third step S103, the owner and the profile of the owner of the at least one hop node are determined. Information on the owner and the profile of the owner of the at least one hop node can be determined through the use of information stored in the hop node and/or by accessing a remote database having stored the respective information which is also reference by a unique ID code. The profile of the hop node owner can also be determined by mining information from web-based resources such as social networks or professional company databases. As for the owner of the network component, the profile of the hop node owner may also be determined by mining crowdsourced information from other users, perhaps who live or work in the same neighborhood or who are close friends of the owner of the at least one hop node. These factors are taken into account when accounting for a respective trust level of the hop node owner. The owner of the potential hop node can also be determined by interrogating the potential hop node either directly or indirectly through a third device such as a network connected server.

In a fourth step S104, the time-variant contextual trust between the owner of the network component and the owner of the hop node are determined. The determination of the time-variant contextual trust can be performed by computing the level of trust of the hop node owner and by computing the relevance of the profile of the owner of the network component to the hop node owner profile in the context of the data to be transferred. For example, if the hop node owner is a known criminal or has friends who are known criminals, it might not be desirable to route data through this hop node, irrespective of other factors. It may also be the case that a hop node is owned by a competing company to the owner of the sensor node/network component. In this case, it is also not desirable to transfer data from the one network component/sensor node to the hop node. Therefore, acceptable and unacceptable profiles of the hop node owner and relationships between the hop node owner and network component owner have to be defined. In this context, also the time-variants of the level and the nature of confidentiality of the data to be transferred can be taken into account. For example, data which has a high initial level of confidentiality needs to be transferred through a hop node with a high contextual trust between the network component owner and the hop node owner. However, data may be transferred through a hop node with a low contextual trust between the sensor owner and the hop node owner at a later time with a significantly decreased level of confidentiality of the data to be transferred.

In a fifth step S105, a hop routing strategy is determined. The determination can be dependent on a number of factors such as the measure of contextual trust which has been established, the level of contextual trust with the sensor node/network component, the time since the last data communication from the sensor node, and the maximum data latency, and/or the likelihood of future hop nodes becoming available, for example based on historical information.

The method according to this embodiment is particularly suitable for the case that the method of data routing in a network is performed by network component or the hop node. In other words, according to said exemplary method the network component can determine the routing strategy to a hop node and/or a hop node can determine the routing strategy to another (next) hop node. Thus, an autonomous network can be created and the network component and each hop node can determine the routing strategy to the next hop node so that data can be transmitted from the network component to the recipient network component.

Figure 2:
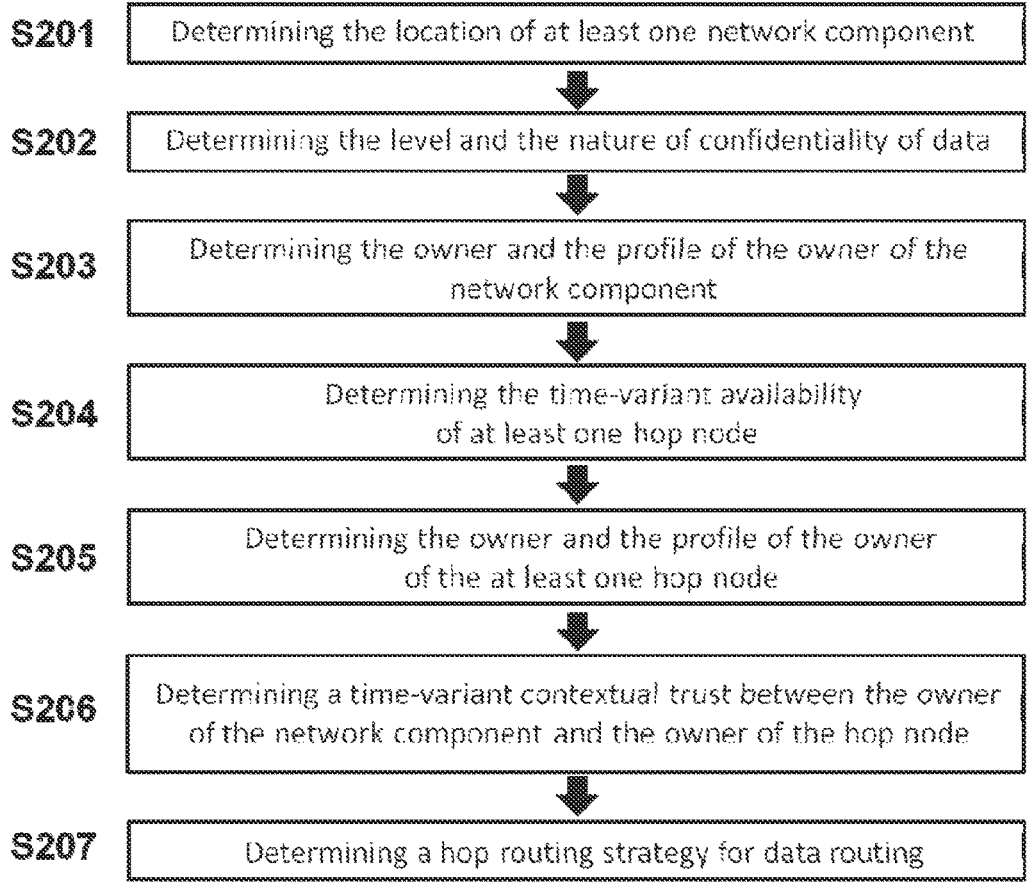
FIG. 2 shows a schematic flowchart of a method of data routing in a network through time-variant contextual trust according to another embodiment of the invention.

FIG. 2 shows a schematic flowchart of a method of data routing in a network through time-variant contextual trust according to another embodiment of the invention.

In a first step, S201, the location of at least one network component, e.g. a sensor node, is determined. The location of the network component can be determined by a number of means including triangulation, detection via a satellite navigation system, such as GPS, or wireless LAN finger printing. Accordingly, the location of the network component can be determined in geographic coordinates. The location of the network component can also be determined by the evaluation of transferred network data such that the location of the network can be given by a network address.

In a next step, S202, the nature and level of the confidentiality of the data to be transferred are determined. The nature and confidentiality level of the data can be stored in a memory, e.g. a ROM, in the sensor module/network component and/or can be stored in an external database which is referenced by a first unique ID code. Accordingly, the nature and level of confidentiality are determined by polling the at least one network component and/or by polling an external data storage device having stored the information on said data component wherein the information is referenced by said first unique ID code.

In a next step, S203, the owner and the profile of the owner of the network component are determined. The owner of the network component can be determined based on the location of the network component and/or by polling the information stored in the network component and/or in an external database which is referenced by a second unique ID code. The profile of the sensor owner can be determined for example by polling the information stored in the sensor node and/or by accessing a remote database having stored the profile of the network component owner. The profile of the sensor owner can also be determined by mining information from web-based resources such as social networks or professional company databases, e.g. Facebook in case of social networks. The profile of the owner of the at least one network component can also be determined by crowdsourcing the information from other users who e.g. have close geographic proximity to the owner of the at least one network component or the network component itself or to estimate a likely profile based on geographic location, meta data and sensor type. For example, the owner of the at least one network component is living in a neighborhood having a bad reputation. Said parameter will be stored in a profile of the at least one network component and can later on be used for the evaluation of contextual trust. The profile of the owner of the sensor/network component is profiled before or when the first network connection is established, preferably upon installation and/or as part of the commissioning process for the sensor/network component. The profile information may then be stored in the memory of the network component/sensor node, e.g. a non-volatile memory, and/or may be associated with the sensor/network component and stored in a respective external data storage device.

In a next step, S204, the time-variant availability of the at least one hop node is determined as hop nodes are likely to move through given trajectories over time.

Hop nodes which are within the range of the sensor node or which can be used to complete the connection between the sensor node and the network recipient may be computed using triangulation, satellite navigation and/or signal strength information. The hop node trajectories may for example also be tracked using location based technologies to determine the current location and movement characteristics of the potential hop node. In this context, also the historical geo-relevant movement of the potential hop node can be taken into account to determine its likely direction and travel speed. In addition, in some embodiments, such as for example rail freight, the sensor node/network component may also be moving with respect to the potential hop nodes. In this case, also this movement/trajectory has to be taken into account.

In a next step, S205, the owner and the profile of the owner of the at least one hop node are determined.

In a next step, S206, the time-variant contextual trust between the owner of the network component and the owner of the hop node are determined.

In a next step, S207, a hop routing strategy is determined. The determination can be dependent on a number of factors such as the measure of contextual trust which has been established for each hop node, the number of hop nodes and the combined/collective level of contextual trust with the sensor node/network component, the time since the last data communication from the sensor node, and the maximum data latency, and/or the likelihood of future hop nodes becoming available, for example based on historical information.

The method according to this embodiment is particularly suitable for the case that the method of data routing in a network is performed by a surveillance system. The surveillance system can determine the routing strategy for all or at least several hop nodes. In other words, according to said exemplary method the surveillance system can determine the routing strategy from the network component to the recipient network component so that data can be transmitted from the network component to the recipient network component.

Figure 3:
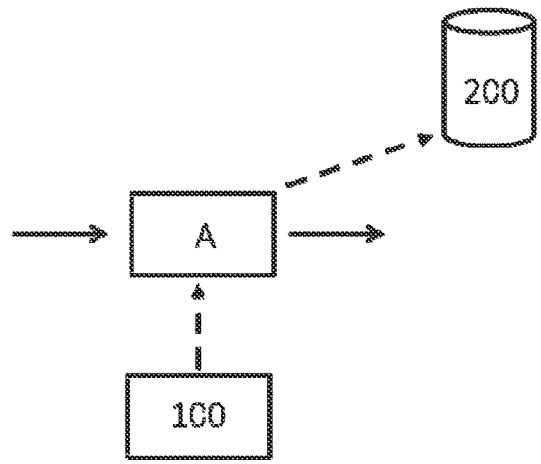
FIG. 3 shows a schematic diagram of a method of data routing in a network through time-variant contextual trust according to another embodiment of the invention.

FIG. 3 shows a schematic diagram of a method of data routing in a network through time-variant contextual trust from a sensor node 100 to the recipient network component 200 according to an embodiment of the invention. Sensor/sensor node 100 is a traffic information sensor passing back traffic and usage data for road or route and is owned by a private road maintenance company. The sensor node 100 has a maximum communication latency of one hour, which means that after one hour at the latest the information packet has to be transferred to a hop node. On average, three different users are able to provide a single hop to a network connection per hour. One minute after the last data communication has occurred, i.e. t+1 min, user A, for example a government employee with a high trust level, can complete the connection hop. In other words, user A owns a hop node, i.e. a smartphone, which is configured to complete the connection hop and user A has a high level of contextual trust based on a determined profile, the data can be transmitted from the sensor node 100 via the hop node of user A to the recipient network component 200, i.e. a government server.

Figure 4A:
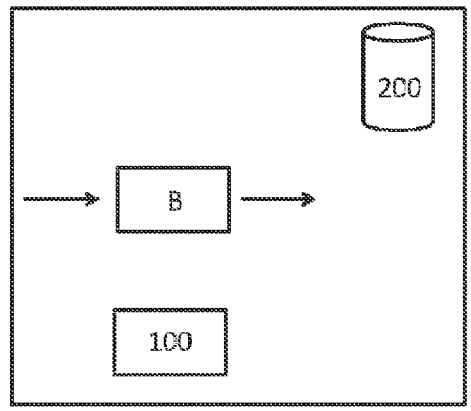
FIGS. 4a, 4b and 4c show schematic diagrams of a method of data routing in a network through time-variant contextual trust according to another embodiment of the invention.
Figure 4B:
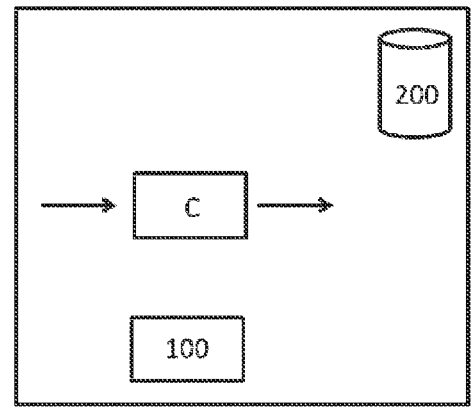
Figure 4C:
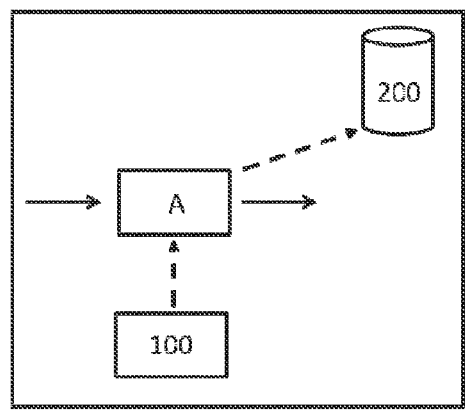

FIGS. 4*a*, 4*b* and 4*c* show schematic diagrams of a method of data routing in a network through time-variant contextual trust according to another embodiment of the invention. In this embodiment, sensor node 100 is a pollution sensor to detect city pollution and is owned by the state government, for example. The sensor node 100 has a maximum communication latency of one hour. On average, three different users are able to provide a single hop to a network connection per hour. FIG. 4*a* shows the case that after one minute of the last communication, i.e. at t+1 min, user B passes by, who is, according to data mining, a bar owner with social network friends who are known criminals, having a low level of contextual trust based on his profile. As a consequence, no data is transmitted to the recipient network component. In FIG. 4*b*, user C passes at t+19 min. However, data mining revealed no specific information on user C, and, therefore, the profile of user C does not contain any information on trust. Accordingly, user C has an unknown level of contextual trust and no data is transmitted to the recipient network component. In FIG. 4*c*, user A, the government employee of known identity, passes by at t+27 min. Due to the high level of contextual trust between the sensor node 100 and User A the data is transmitted from the sensor node 100 to the recipient network component 200, a state owned server, via user A.

Figure 5A:
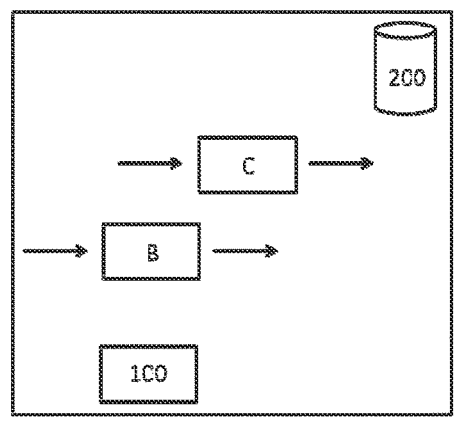
FIGS. 5a, 5b and 5c show schematic diagrams of a method of data routing in a network through time-variant contextual trust according to another embodiment of the invention.
Figure 5B:
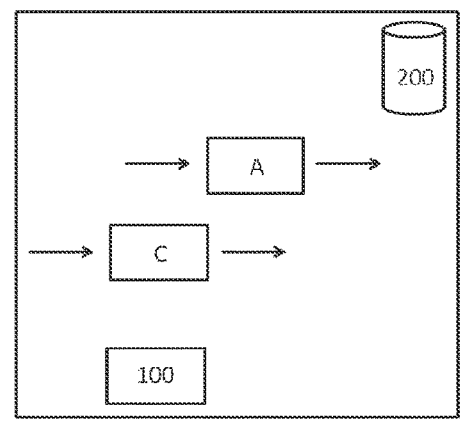
Figure 5C:
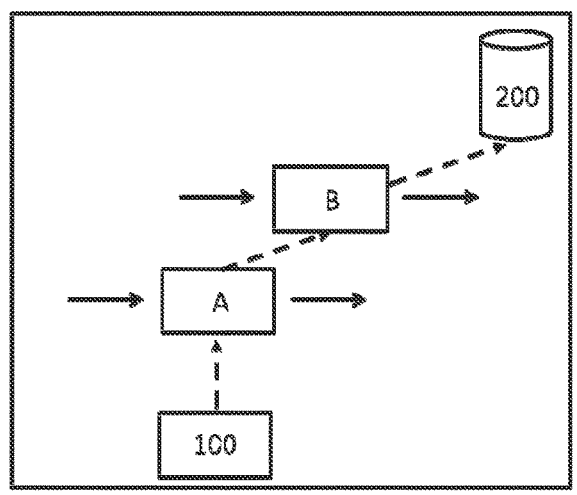

FIGS. 5*a*, 5*b* and 5*c* show schematic diagrams of a method of data routing in a network through time-variant contextual trust according to another embodiment of the invention. Again, sensor node 100 is a pollution sensor to detect city pollution owned by the state government with a latency of one hour. On average, ten different users are able to provide two subsequent hops to establish a network connection from the sensor node 100 to the recipient network component 200 per hour. In FIG. 5*a*, user B, the bar owner with social network friends who are known criminals, and user C with unknown trust level, could complete the connection hop at t+1 min from the sensor node 100 to the recipient network component 200. However, users B and C have a combined low level of contextual trust based on their profiles and no data is transmitted. In FIG. 5*b*, user C and user A, the government employee of known identity and high level of trust, could complete the connection hop at t+19 min. However, users C and A have a combined unknown level of contextual trust and no data is transmitted either. FIG. 5*c* shows the case for t+57 min. At this time the aforementioned one hour latency limit is nearly reached. Users A and B who could complete the connection hop, despite having a combined unknown level of contextual trust, are allowed/used to transmit the data from the sensor node 100 to the recipient network component 200 due to the latency limit.

Figure 6A:
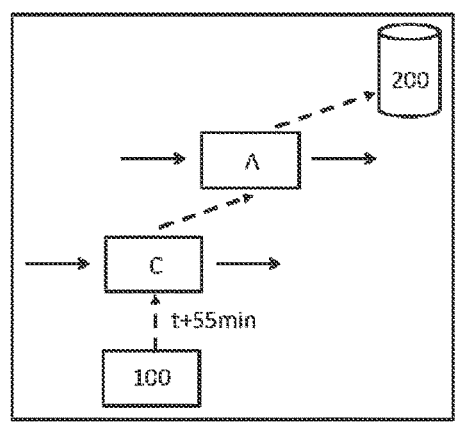
FIGS. 6a, 6b and 6c show schematic diagrams of a method of data routing in a network through time-variant contextual trust according to another embodiment of the invention.
Figure 6B:
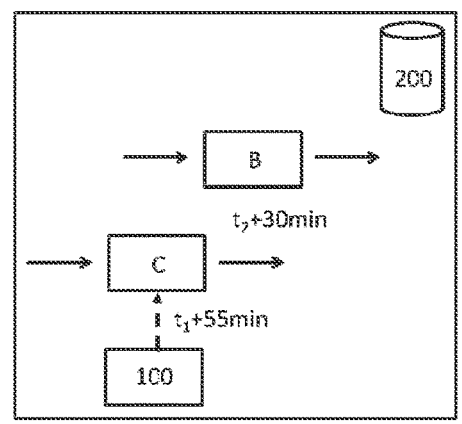
Figure 6C:
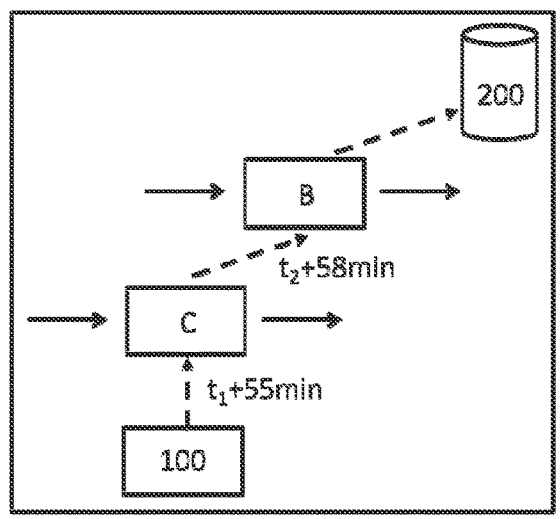

FIGS. 6*a*, 6*b* and 6*c* show schematic diagrams of a method of data routing in a network through time-variant contextual trust according to another embodiment of the invention. Again, sensor node 100 is a pollution sensor to detect city pollution owned by the state government with a latency of one hour. On average, ten different users are able to provide two subsequent hops to establish a network connection from the sensor node 100 to the recipient network component 200 per hour. In FIG. 6*a*, user C with unknown trust level, passes at t+55 min. At this time the aforementioned one hour latency limit is nearly reached. Therefore, the sensor node 100 transmits the data to the user C despite the unknown trust level. At a later time, user A, the government employee of known identity and high level of trust passes the range of user C, and user C transmits the data to user A which in turn transmits the data to the recipient network component 200.

In FIG. 6*b*, both the sensor node 100 as well as the data to be transmitted have a latency of one hour. At 55 minutes after the last communication of the sensor node 100, i.e. $t_1+55$ min, user C passes the sensor node 100. Due to the nearly reached one hour latency limit, the data is transmitted from the sensor node 100 to user C. At 30 minutes after user C received the data from the sensor node 100, i.e. t2+30 min, user B, the bar owner with social network friends who are known criminals, passes user C. However, due to the low trust level and not being close to the one hour latency limit of the data to be transmitted, no data is transmitted.

In FIG. 6*c*, the one hour latency limit of the data to be transmitted is nearly reached at $t_2+58$ min. At this time, user B passes again and due to the nearly reached time limit the data is transmitted from user C to user B despite the low trust level. The data is then transmitted from user B to the recipient network component 200.

Figure 7A:
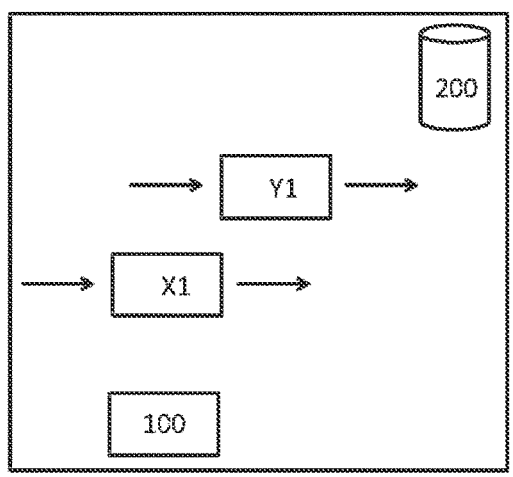
FIGS. 7a, 7b and 7c show schematic diagrams of a method of data routing in a network through time-variant contextual trust according to another embodiment of the invention.
Figure 7B:
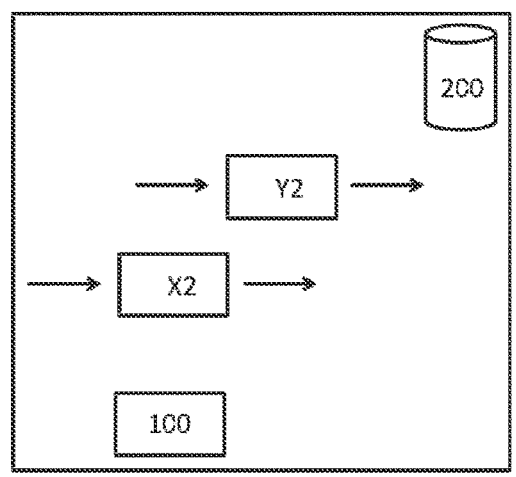
Figure 7C:
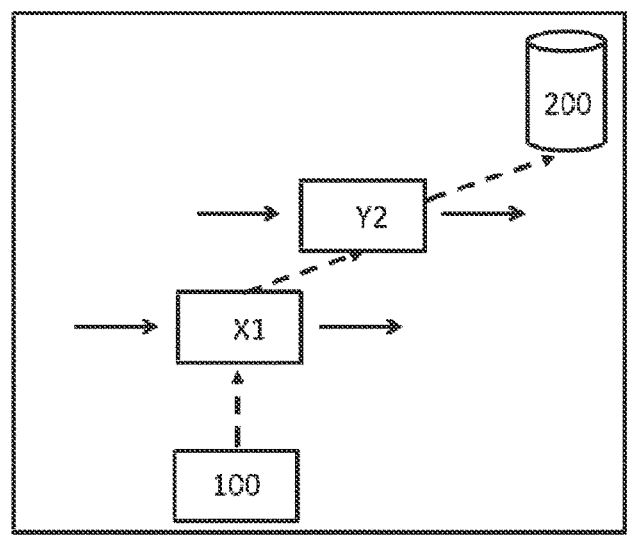

FIGS. 7*a*, 7*b* and 7*c* show schematic diagrams of a method of data routing in a network through time-variant contextual trust according to another embodiment of the invention. The network component 100 has a maximum communication latency of ten minutes. On average three users having hop nodes being able to provide a link and to transmit data to either the hop node Y1 or the hop node Y2 every ten minutes. The network component 100 is owned by company Z, the network component Y1 is owned by company Y and the network component Y2 is owned by company K. Both, the hop node Y1 and Y2 are configured to establish a link and to transmit data to the recipient network component 200. In FIG. 7*a*, user X1 passes after 1 minute but is only within the range of Y1. However, company Y is a company that has interest in collecting customer data for resale. In FIG. 7*b*, user X2, who has low contextual trust due to known criminal connections, passes after five minutes and is within the range of Y2. The owner of Y2, company Y is associated to the company owning the network component 100. However, due to the low contextual trust, no data is transmitted. In FIG. 7*c*, at t+7 min, user X1 passes again, and this time, he is able to complete the connection through Y2 and the data is transmitted from the network component 100 to the recipient network component 200 via user X1 and hop node Y2.

Figure 8A:
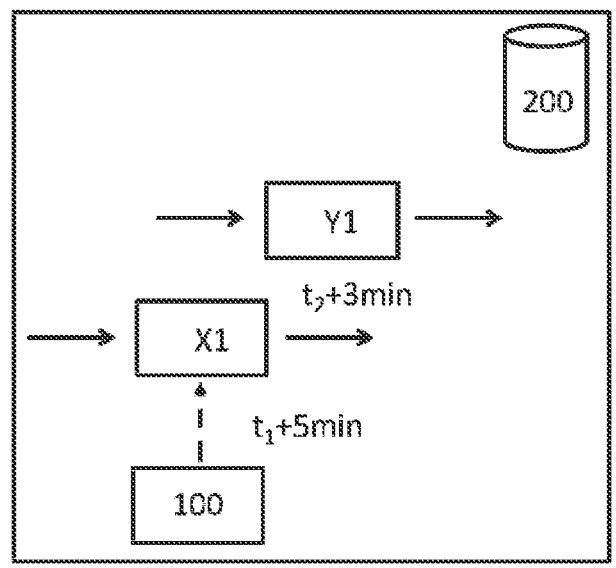
FIGS. 8a and 8b show schematic diagrams of a method of data routing in a network through time-variant contextual trust according to another embodiment of the invention.
Figure 8B:
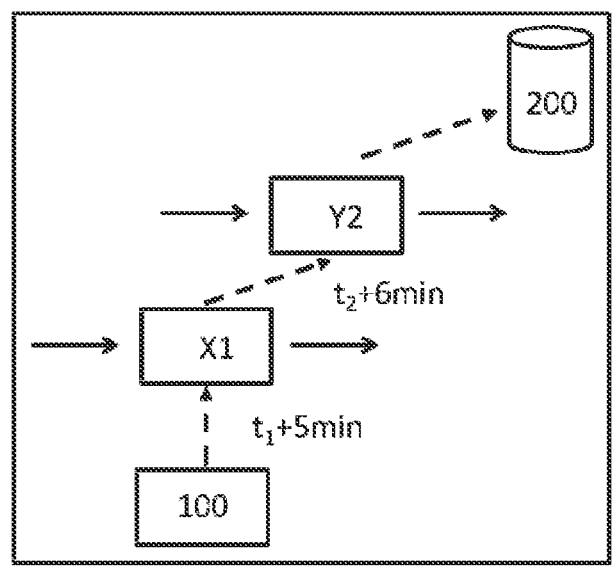

FIGS. 8*a* and 8*b* show schematic diagrams of a method of data routing in a network through time-variant contextual trust according to another embodiment of the invention. The properties of the network component 100, the hop nodes Y1, Y2, the users X1, X2 as well as the companies K, Z are the same as in the embodiment shown in FIGS. 6*a* to 6*c*. In FIG. 8*a*, user X1 passes after 5 minutes, i.e. $t_1+5$ min and the data is transmitted to user X1. At 3 minutes after the data transmission from the sensor node to user X1, i.e. at $t_2+3$ min, user X1 is within the range of the hop node Y1. Due to the aforementioned low trust level as a result of the interest in collecting customer data for resale, the data is not transmitted to the hop node Y1.

In FIG. 8b, user X1 is at $t_2+6$ min within the range of the hop node Y2. Due to the high trust level as a result of company Y being the owner of both the sensor node 100 as well as the hop node Y2, the data is transmitted to the hop node Y2. Afterwards, the data is transmitted from Y2 to the recipient network component 200.

FIGS. 9a and 9b show schematic diagrams of a method of data routing in a network through time-variant contextual trust according to another embodiment of the invention. Sensor node 100 is, for example, a sensor on a garbage can sensing the fill level of the garbage can. Sensor node 100 is owned by a waste management company W2 which is responsible for the waste cleanup of the respective garbage can. According to this embodiment, sensor 100 has no maximum communication latency and is only submitting the data upon appropriate request. In FIG. 9a, when a garbage truck of company W1, a waste management company which is not responsible for emptying the respective garbage can, is approaching the sensor node 100. The garbage truck of W1 is sending a request for data to be transmitted but due to the low level of contextual trust, no data is transmitted. In FIG. 9b, a garbage truck of company W2 which is responsible for emptying the respective garbage can is approaching to sensor 100, and a data transfer is requested. Due to the high level of contextual trust, sensor 100 transmits the data to the garbage truck of company W2 which is then transferred to the recipient network component 200, i.e. the respective server of the waste management system.

FIG. 10 shows a schematic diagram of a method of data routing in a network through time-variant contextual trust according to another embodiment of the invention. In a scenario of a natural catastrophe, e.g. an earthquake, common mobile and/or landline networks may break down. However, mobile ad-hoc networks (MANETs) could be established in the following manner: a government owned sensor 100 has data packets to be transmitted with a high level of confidentiality. Within the maximum communication latency, e.g. one hour, the government employee G1 with a high trust level passes by and data is transmitted to the government employee G1. G1 establishes an ad-hoc connection to another government employee G2 as soon as he is within the range of establishing an ad-hoc connection to G2 due to G2 also having a high trust level. Accordingly the data is transmitted to G2. G2 then transmits the data to a further government employee G3 as soon as he is able to establish an ad-hoc connection due to G3 also having a high trust level. G3 then transmits the data to a fourth government employee G4 having a high trust level as well in the same manner. The government employee G4 then finally transmits the data to the recipient network component 200, i.e. a respective government server.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of data routing in a network through time-variant contextual trust, comprising:
   determining, by the network, a level and a nature of confidentiality of data to be transmitted from at least one network component to at least one recipient network component, wherein the level and the nature of confidentiality is determined by polling the at least one network component and/or by polling an external data storage device having stored information, the information being referenced by a unique ID code;
   determining, by the network, a time-variant availability of at least one hop node;
   determining, by the network, an owner of the at least one hop node, an owner of the at least one network component, a profile of the owner of the at least one hop node, and a profile of the owner of the at least one network component;
   determining, by the network, a time-variant contextual trust between the owner of the at least one network component and the owner of the at least one hop node by computing a level of trust of the owner of the at least one hop node and by computing a relevance of the profile of the owner of the at least one network component to the profile of the owner of the at least one hop node in the context of the data;
   determining, by the network, a hop routing strategy for routing the data from the at least one network component or from at least one other hop node to the at least one hop node or to the at least one recipient network component to generate one or more possible hop connection paths, wherein determining the hop routing strategy is based on: a desired level of trust for the data, a measure of contextual trust between the owner of the at least one network component and the owner of the at least one hop node and/or between the at least one hop node and another hop node, and a time-variant sensitivity of the data, wherein the time-variant sensitivity comprises a time-variant level of confidentiality of the data; and routing, by the network, the data to the at least one recipient network component based on the determined hop routing strategy.

2. The method according to claim 1, further comprising: determining a location of at least one network component.

3. The method according to claim 1, further comprising:
selecting one of the one or more possible hop connection paths; and
transmitting the data using the selected path.

4. The method according to claim 1, wherein the hop routing strategy is determined further based on at least one of the following:
a number of hop nodes and a collective level of contextual trust of the hop nodes,
a time since a previous data transfer from the at least one network component to the at least one recipient network component,
a maximum latency time for the data being transmitted, the possibility of further potential hop nodes becoming available,
a time-variant security policy for each potential hop node, and
an urgency corresponding to transmission of data.

5. The method according to claim 2, wherein the location of the at least one network component is determined using at least one of: triangulation and satellite navigation.

6. The method according to claim 1, wherein information related to the owner and/or the profile of the owner of the at least one network component is determined by polling the at least one network component and/or by polling an external data storage device having stored information on the owner and/or the profile of the owner of the at least one network component, the information being referenced by a unique ID code.

7. The method according to claim 1, wherein the profile of the owner of the at least one network component is determined using at least one of:
information stored in the at least one network component and/or in the external data storage device,
mining information from web-based resources,
crowdsourcing information from other owners of network components and/or hop nodes,
estimating the likely profile based on geographic location, metadata and/or network component type, and
evaluation of transferred network data.

8. The method according to claim 1, further comprising:
collecting information on the owner of the at least one hop node and the profile of the owner of the at least one hop node through the at least one hop node by the at least one network component using additional security layers in the case where the hop routing strategy results in only one possible hop connection path.

9. The method according to claim 1, further comprising: determining a time-variant contextual trust between the at least one hop node and another hop node.

10. The method according to claim 1, further comprising: ranking the one or more possible hop connection paths.

11. The method according to claim 1, wherein the network is a sensor network and the at least one network component is a sensor node.

12. The method according to claim 1, wherein the network is an ad-hoc network.

13. The method according to claim 1, wherein the network is a single-hop or a multi-hop network.

14. A system comprising one or more computer-readable media having processor-executable instructions stored thereon for data routing in a network through time-variant contextual trust, the processor-executable instructions comprising instructions for:
determining a level and a nature of confidentiality of data to be transmitted from at least one network component to at least one recipient network component, wherein the level and the nature of confidentiality is determined by polling the at least one network component and/or by polling an external data storage device having stored information, the information being referenced by a unique ID code;
determining a time-variant availability of at least one hop node;
determining an owner of the at least one hop node, an owner of the at least one network component, a profile of the owner of the at least one hop node, and a profile of the owner of the at least one network component;
determining a time-variant contextual trust between the owner of the at least one network component and the owner of the at least one hop node by computing a level of trust of the owner of the at least one hop node and by computing a relevance of the profile of the owner of the at least one network component to the profile of the owner of the at least one hop node in the context of the data;
determining a hop routing strategy for routing the data from the at least one network component or from at least one other hop node to the at least one hop node or to the at least one recipient network component to generate one or more possible hop connection paths, wherein determining the hop routing strategy is based on: a desired level of trust for the data, a measure of contextual trust between the owner of the at least one network component and the owner of the at least one hop node and/or between the at least one hop node and another hop node, and a time-variant sensitivity of the data, wherein the time-variant sensitivity comprises a time-variant level of confidentiality of the data; and
routing the data to the at least one recipient network component based on the determined hop routing strategy.

15. The system according to claim 14, wherein the processor-executable instructions further comprise instructions for:
determining a location of at least one network component.

16. The system according to claim 14, wherein the hop routing strategy is determined further based on at least one of the following:
a number of hop nodes and a collective level of contextual trust of the hop nodes,
a time since a previous data transfer from the at least one network component to the at least one recipient network component,
a maximum latency time for the data being transmitted, the possibility of further potential hop nodes becoming available,
a time-variant security policy for each potential hop node, and
an urgency corresponding to transmission of data.

17. The system according to claim 14, wherein the processor-executable instructions further comprise instructions for:
   collecting information on the owner of the at least one hop node and the profile of the owner of the at least one hop node through the at least one hop node by the at least one network component using additional security layers in the case where the hop routing strategy results in only one possible hop connection path.

18. The system according to claim 14, wherein the processor-executable instructions further comprise instructions for:
   transmitting data without checking any time-variant contextual trust in case of low battery of the at least one network component, urgency of data transmission or low level of confidentiality of data to be transmitted.

* * * * *